United States Patent [19]
Peckham

[11] Patent Number: 6,009,608
[45] Date of Patent: Jan. 4, 2000

[54] BRAKE CHAMBER ASSEMBLING DEVICE

[76] Inventor: Bruce Peckham, 11276 Ruralview Dr., Holland, Mich. 49424

[21] Appl. No.: 09/082,687

[22] Filed: May 21, 1998

[51] Int. Cl.⁷ .................................................... B23P 19/04
[52] U.S. Cl. ................................. 29/268; 81/423; 81/426; 81/426.5
[58] Field of Search ............................ 29/268, 280, 282; 269/6; 81/423, 426, 424.5, 426.5

[56] References Cited

U.S. PATENT DOCUMENTS

| | | | |
|---|---|---|---|
| 2,755,541 | 7/1956 | Kruger | 29/268 |
| 4,776,079 | 10/1988 | Cameron | 81/426.5 |
| 4,881,434 | 11/1989 | Keller | 81/426 |

*Primary Examiner*—Robert C. Watson

[57] ABSTRACT

A new brake chamber assembling device for reassembling truck air brake systems after maintenance. The inventive device includes a pair of jaws extend outwardly from the vise grip pliers. The pair of jaws include an upper jaw section and a lower jaw section. The upper jaw section has a notch cut out of an outer end thereof for supporting an upper end of a casing shaft of a brake chamber. The lower jaw section has an aperture through an outer end thereof for receiving a lower end of the casing shaft therein.

3 Claims, 2 Drawing Sheets

BRAKE CHAMBER ASSEMBLING DEVICE

BACKGROUND OF THE INVENTION

1. Field of the Invention

The present invention relates to brake adjustment devices and more particularly pertains to a new brake chamber assembling device for reassembling truck air brake systems after maintenance.

2. Description of the Prior Art

The use of brake adjustment devices is known in the prior art. More specifically, brake adjustment devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art brake adjust ment devices include U.S. Pat. No. 5,074,175 to Earle; U.S. Pat. No. 4,903,391 to Franks; U.S. Pat. No. 3,835,522 to Ward; U.S. Pat. No. 3,007,241 to Gonzalez; U.S. Pat. No. 440,609 to Rusk; and U.S. Pat. No. 4,288,899 to McKee.

While these devices fulfill their respective, particular objectives and requirements, the aforementioned patents do not disclose a new brake chamber assembling device. The inventive device includes a pair of jaws extend outwardly from the vise grip pliers. The pair of jaws include an upper jaw section and a lower jaw section. The upper jaw section has a notch cut out of an outer end thereof for supporting an upper end of a casing shaft of a brake chamber. The lower jaw section has an aperture through an outer end thereof for receiving a lower end of the casing shaft therein.

In these respects, the brake chamber assembling device according to the present invention substantially departs from the conventional concepts and designs of the prior art, and in so doing provides an apparatus primarily developed for the purpose of reassembling truck air brake systems after maintenance.

SUMMARY OF THE INVENTION

In view of the foregoing disadvantages inherent in the known types of brake adjustment devices now present in the prior art, the present invention provides a new brake chamber assembling device construction wherein the same can be utilized for reassembling truck air brake systems after maintenance.

The general purpose of the present invention, which will be described subsequently in greater detail, is to provide a new brake chamber assembling device apparatus and method which has many of the advantages of the brake adjustment devices mentioned heretofore and many novel features that result in a new brake chamber assembling device which is not anticipated, rendered obvious, suggested, or even implied by any of the prior art brake adjustment devices, either alone or in any combination thereof.

To attain this, the present invention generally comprises a pair of vise grip pliers comprised of a pair of adjustable handles. One of the handles has a threaded shaft with a knurled knob disposed on an outer end thereof. The threaded shaft adjusts a distance between the handles. The other handle has a locking mechanism and release lever incorporated therein. A pair of jaws extend outwardly from the vise grip pliers. The pair of jaws include an upper jaw section and a lower jaw section. The upper jaw section has a notch cut out of an outer end thereof for supporting an upper end of a casing shaft of a brake chamber. The lower jaw section has an aperture through an outer end thereof for receiving a lower end of the casing shaft therein. An adapter sleeve is provided having a lower end dimensioned for being received within the aperture of the lower jaw section of the pair of jaws. The adapter sleeve has an open upper end for receiving a casing shaft therein.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein arc for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new brake chamber assembling device apparatus and method which has many of the advantages of the brake adjustment devices mentioned heretofore and many novel features that result in a new brake chamber assembling device which is not anticipated, rendered obvious, suggested, or even implied by any of the prior art brake adjustment devices, either alone or in any combination thereof.

It is another object of the present invention to provide a new brake chamber assembling device which may be easily and efficiently manufactured and marketed.

It is a further object of the present invention to provide a new brake chamber assembling device which is of a durable and reliable construction.

An even further object of the present invention is to provide a new brake chamber assembling device which is susceptible of a low cost of manufacture with regard to both materials and labor, and which accordingly is then susceptible of low prices of sale to the consuming public, thereby making such brake chamber assembling device economically available to the buying public.

Still yet another object of the present invention is to provide a new brake chamber assembling device which provides in the apparatuses and methods of the prior art some of the advantages thereof, while simultaneously overcoming some of the disadvantages normally associated therewith.

Still another object of the present invention is to provide a new brake chamber assembling device for reassembling truck air brake systems after maintenance.

Yet another object of the present invention is to provide a new brake chamber assembling device which includes a pair of jaws extend outwardly from the vise grip pliers. The pair of jaws include an upper jaw section and a lower jaw section. The upper jaw section has a notch cut out of an outer end thereof for supporting an upper end of a casing shaft of a brake chamber. The lower jaw section has an aperture through an outer end thereof for receiving a lower end of the casing shaft therein.

These together with other objects of the invention along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
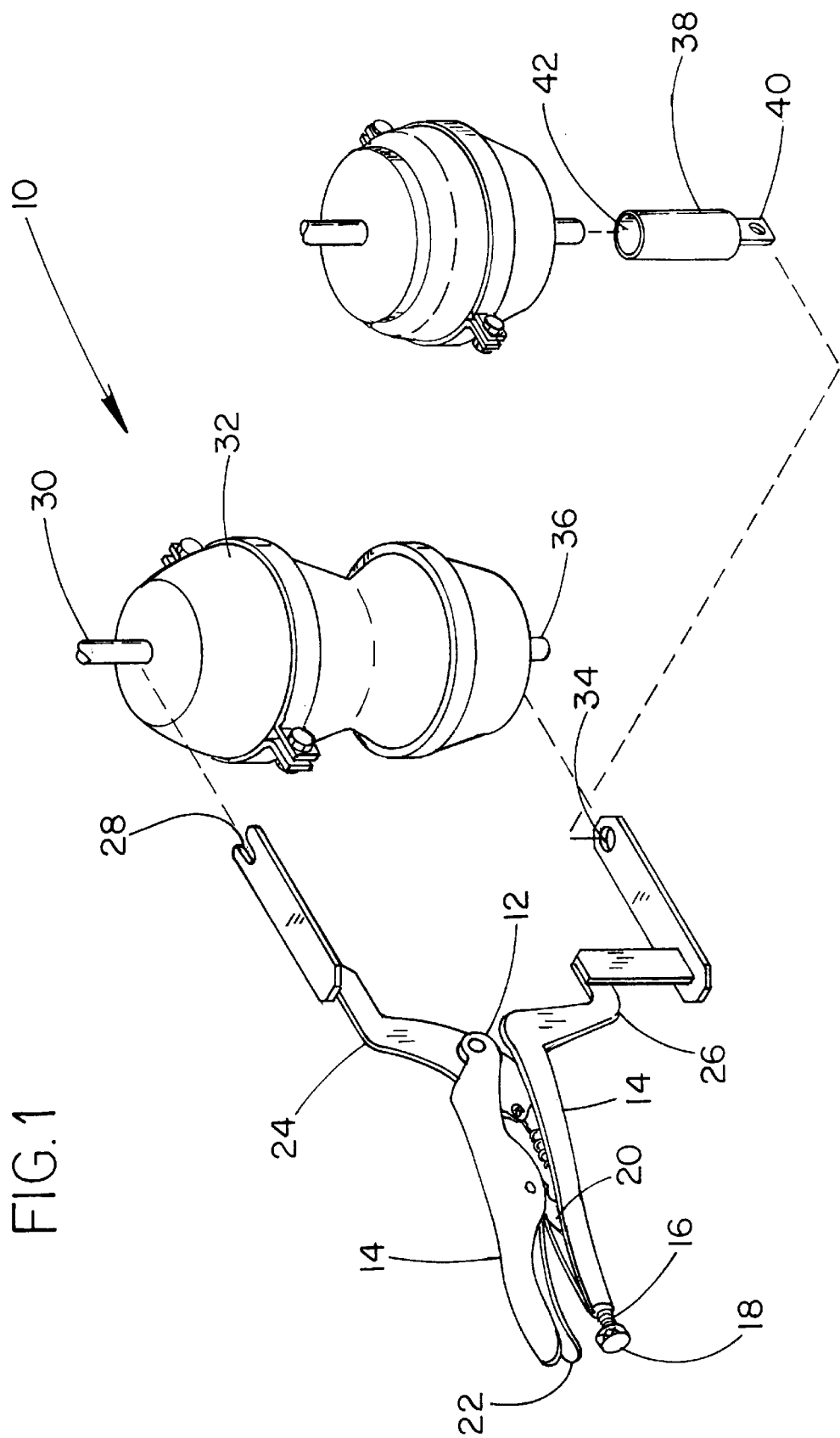
FIG. 1 is a perspective view of a new brake chamber assembling device according to the present invention illustrated in use.
Figure 2:
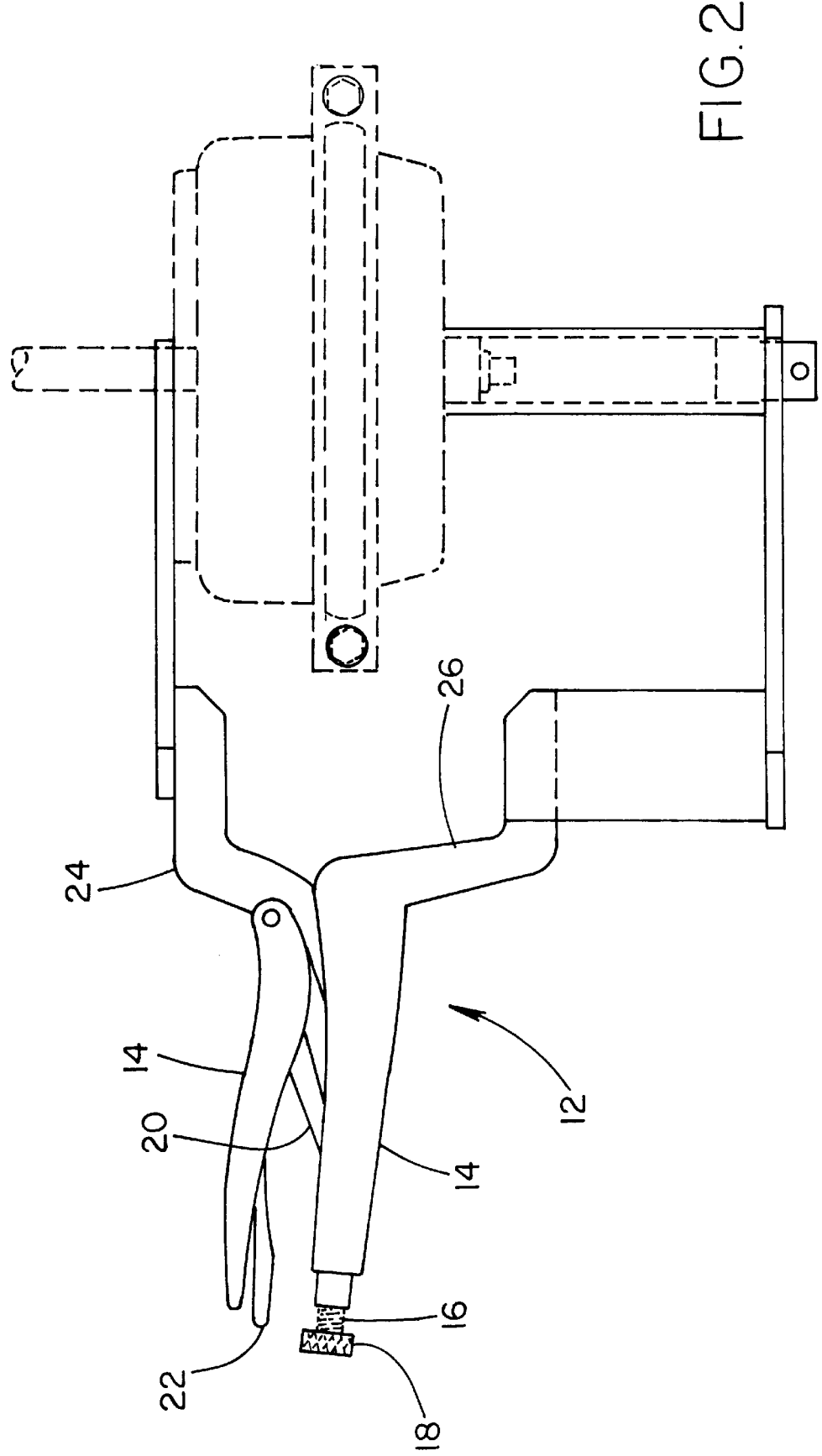
FIG. 2 is a side view of the present invention illustrated in use.

With reference now to the drawings, and in particular to FIGS. 1 and 2 thereof, a new brake chamber assembling device embodying the principles and concepts of the present invention and generally designated by the reference numeral 10 will be described.

As best illustrated in FIGS. 1 and 2, the brake chamber assembling device 10 comprises a pair of vise grip pliers 12 comprised of a pair of adjustable handles 14. One of the handles has a threaded shaft 16 with a knurled knob 18 disposed on an outer end thereof. The threaded shaft 16 adjusts a distance between the handles 14. The other handle has a locking mechanism 20 and release lever 22 incorporated therein.

A pair of jaws extend outwardly from the vise grip pliers 12. The pair of jaws include an upper jaw section 24 and a lower jaw section 26. The upper jaw section 24 has a notch 28 cut out of an outer end thereof for supporting an upper end of a casing shaft 30 of a brake chamber 32. The lower jaw section 26 has an aperture 34 through an outer end thereof for receiving a lower end of the casing shaft 36 therein.

An adapter sleeve 38 is provided having a lower end 40 dimensioned for being received within the aperture 34 of the lower jaw section 26 of the pair of jaws. The adapter sleeve 38 has an open upper end 42 for receiving a casing shaft therein.

In use, a mechanic would simply assemble the halves of the brake chamber 32 casing with the diaphragm in place. The components would then be placed between the pair of jaws with the jaws being adjusted as needed and the adapter sleeve 38 being put in place on the lower jaw 26, if necessary. Once the tool was properly adjusted and the chamber 32 and diaphragm in place, the handles 14 would be squeezed until the locking mechanism 20 took. Then, the stock retaining clamp for the chamber 32 and diaphragm assembly could be installed easily, without the user worrying about trying to keep the chamber halves and diaphragm together in the process. Once the components were properly clamped together, the handles 14 would be released by pressing the release lever 22, and the chamber 32 and diaphragm assembly could be re-installed as usual.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A new brake chamber assembling device for reassembling truck air brake systems after maintenance comprising, in combination:

a pair of vise grip pliers comprised of a pair of adjustable handles, one of the handles having a threaded shaft with a knurled knob disposed on an outer end thereof, the threaded shaft adjusting a distance between the handles, the other handle having a locking mechanism and release lever incorporated therein;

a pair of jaws extending outwardly from the vise grip pliers, the pair of jaws including an upper jaw section and a lower jaw section, the upper jaw section having a notch cut out of an outer end thereof for supporting an upper end of a casing shaft of a brake chamber, the lower jaw section having an aperture through an outer end thereof for receiving a lower end of the casing shaft therein;

an adapter sleeve having a lower end dimensioned for being received within the aperture of the lower jaw section of the pair of jaws, the adapter sleeve having an open upper end for receiving a casing shaft therein.

2. A brake chamber assembling device for reassembling truck air brake systems after maintenance comprising, in combination:

a pair of jaws extending outwardly from vise grip pliers, the pair of jaws including an upper jaw section and a lower jaw section, the upper jaw section having a notch cut out of an outer end thereof for supporting an upper end of a casing shaft of a brake chamber, the lower jaw section having an aperture through an outer end thereof for receiving a lower end of the casing shaft therein; and an adapter sleeve having a lower end dimensioned for being received within the aperture of the lower jaw section of the pair of jaws, the adapter sleeve having an open upper end for receiving a casing shaft therein.

3. A brake chamber assembling device for reassembling truck air brake systems after maintenance, said brake chamber assembling device comprising:

a pair of vise grip pliers having of a pair of adjustable handles, one of said handles having a threaded shaft with a knurled knob disposed on an outer end thereof, the threaded shaft adjusting a distance between the handles, the other of said handles having a locking mechanism and release lever incorporated therein;

a pair of jaws extending outwardly from the vise grip pliers, the pair of jaws including an upper jaw section and a lower jaw section, the upper jaw section having a notch cut out of an outer end thereof for supporting an upper end of a casing shaft of a brake chamber, the lower jaw section having an aperture through an outer end thereof for receiving a lower end of the casing shaft therein;

said upper jaw section and said lower jaw section each include a substantially planar distal portion, said distal portions of said upper and lower jaw sections being aligned substantially parallel to each other and to a longitudinal axis of said vise grip pliers when said vise grip pliers are in a closed position;

wherein said lower jaw section further includes an offset member coupled between said distal portion of said lower jaw section and said vise grip pliers such that an orthogonal distance between said distal portion of said lower jaw section and said longitudinal axis of said vise grip pliers is greater than an orthogonal distance between said distal portion of said upper jaw section and said longitudinal axis of said vise grip pliers; and an adapter sleeve having a lower end dimensioned for being received within the aperture of the lower jaw section of the pair of jaws, the adapter sleeve having an open upper end for receiving a casing shaft therein.

* * * * *